INVENTOR
RICHARD A. SORRELL
BY *Fisher & Christen*

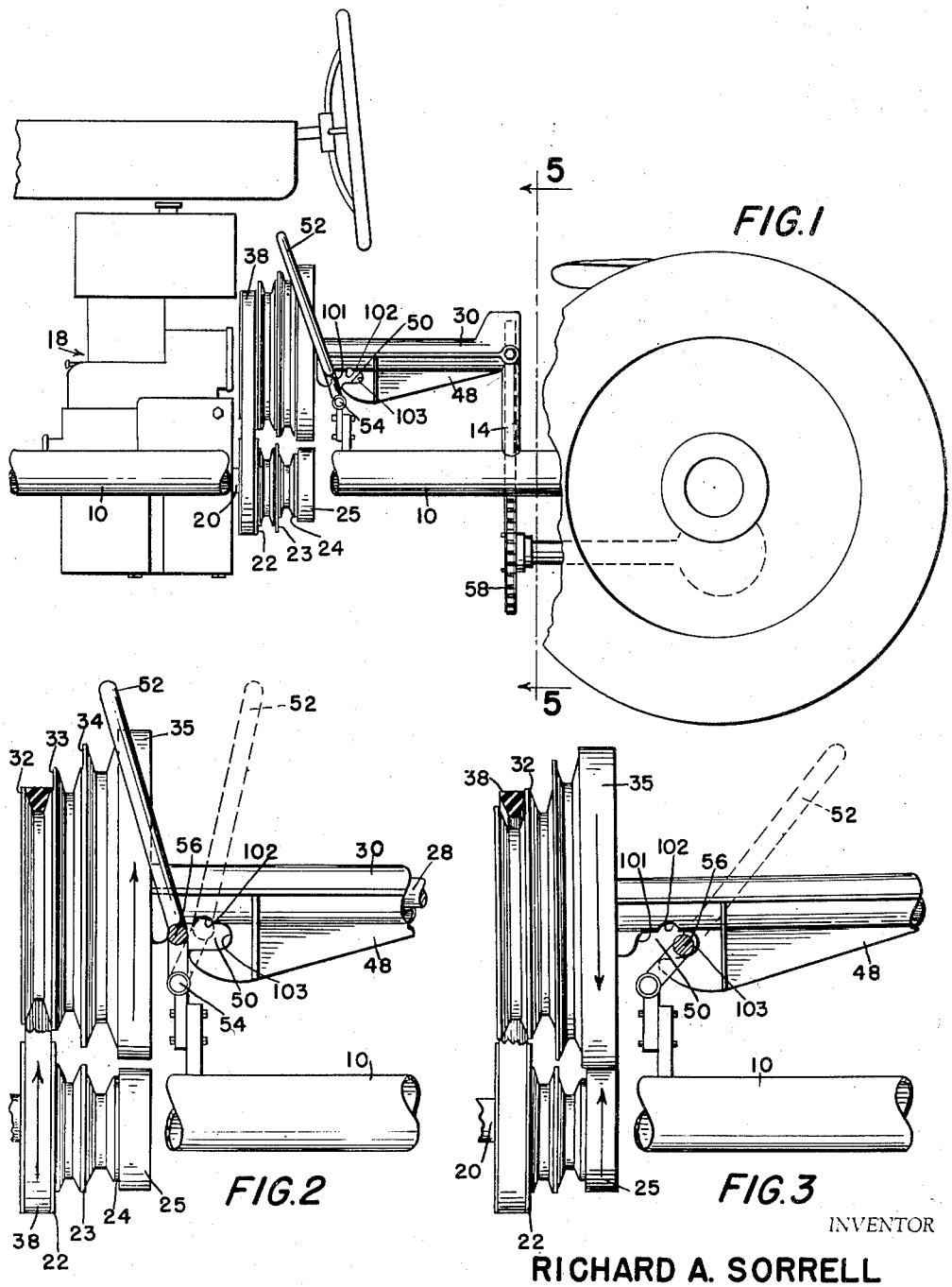

ATTORNEYS

United States Patent Office 2,780,107
Patented Feb. 5, 1957

2,780,107

REVERSING DRIVE

Richard A. Sorrell, Prince Georges County, Md., assignor, by mesne assignments, to Copar, Incorporated, Laurel, Md., a corporation of Maryland Applicaion April 9, 1954, Serial No. 422,029

2 Claims. (Cl. 74—203)

The present invention relates to a reversing drive for a wheeled vehicle or the like and more particularly, to a simplified reversing drive for a small garden tractor. This invention is a simple and sturdy change speed and reverse drive of general application; it will be described particularly as applied to a small tractor, but the invention is not to be limited to this particular use.

It is known in the prior art, as in Lewis Patent No. 2,602,341 of 1952, to provide a reversing drive in which parallel shafts are provided with a belt drive and a friction drive and a reverse direction is obtained by moving the shafts away from one another to engage the belt drive or moving the shafts closer to one another to engage the friction drive. Heretofore it has been thought necessary to keep the axes of both shafts parallel.

It has now been found that by pivotally mounting one power shaft, the reversing can be accomplished equally well and the new construction is particularly adapted to use with conventional drive shaft arrangement wherein the drive shaft leading to the rear traction wheels extends longitudinally of the vehicle as does the power output shaft of the motor. This construction provides a compact design unattainable by prior art constructions and at the same time reduces production costs by virtue of its simplicity.

The present invention comprises driving and driven shafts which are substantially parallel and offset from one another in overlapping relation, adjacent ends of the two shafts being provided respectively with pulleys and friction wheels for rotation in the same or opposite directions; the important novel feature is that the outer or other end of the driven shaft is mounted in a bracket which pivots about a transverse axis, preferably horizontal, so that when the driven shaft is pivoted about this axis, the pulleys or friction wheels are alternatively connected, for forward or reverse drive. The outer end of the driven shaft is provided with a sprocket or pulley concentric with the driven shaft, the transverse axis of this sprocket or pulley passing through the pivotal axis of the pivoted bracket.

More specifically, according to the present invention, a wheeled tractor is provided with a frame and a motor mounted thereon, a motor output shaft, a control shaft pivotally attached to the frame, a friction drive for connecting the shafts in driving engagement in one direction when the control shaft is in one position, a belt drive for connecting the shafts in driving engagement in the opposite direction when the control shaft is in another position, a manually operable control member connected with said frame and said control shaft for pivoting said control shaft to connect the desired drive, a sprocket at the pivot end of the control shaft, a sprocketed drive for the traction wheels and a chain connecting the drive shaft sprocket with the control shaft sprocket, the axis of said control shaft pivot extending horizontally across the tractor and through the center of the axis of said sprocket.

It is an important feature of the invention that the pivoted control shaft carries a friction ring and a belt pulley for operative relationship with a friction ring and belt pulley of the motor output shaft. A V-belt is preferred as it has a natural tendency to hold its position when the control shaft is tilted to bring the friction drive into operation. Mounting the control shaft power take-off sprocket on the axis of the control shaft pivot is very important because that construction minimizes the tilt of the sprocket caused by changing the pivotal position of the control shaft. It has been found that the tilt is so minimized that no increase in chain and sprocket deterioration has been noted over constructions where the sprocket is never tilted.

It will be understood that the control shaft power take-off sprocket will be in perfect alignment with the sprocket it drives in the forward movement of the vehicle and at the same time, the pulleys of the belt drive will be in perfect alignment. At least one friction ring may be provided with an angled surface to assure proper driving relationship when the control shaft is tilted to the reverse position.

Another feature of this invention is the provision of a plurality of belt drives and the provision of a neutral position for the control shaft so that the belt may be manually shifted to provide different forward speeds.

The invention will be better understood by reference to the attached drawings in which—

Figure 1 is a side elevation of a tractor constructed in accordance with this invention in which some of the parts have been broken away to better show the invention.

Figure 2 is a more detailed view of the belt drive and reverse drive with the tractor in high gear.

Figure 3 is a similar view with the tractor in reverse.

Figure 4:
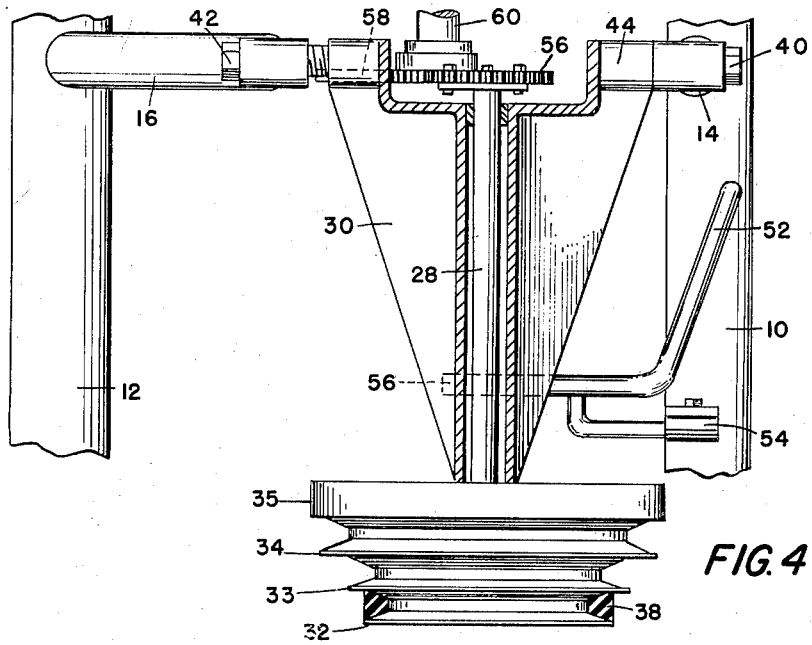
Figure 4 is a plan view, partially in cross-section, of the control shaft and its frame mounting.

In that preferred embodiment of the invention illustrated in the drawings, a frame for a conventional small tractor includes two side members 10 and 12, axles not shown and a pair of brackets 14 and 16, the purpose of which will be more fully explained below. A gasoline motor indicated generally at 18 is mounted on the frame and is provided with a power output shaft 20. Mounted for rotation with the power output shaft are three V-belt pulleys 22, 23 and 24 and a friction ring 25.

A control assembly including a control drive shaft 28 mounted in a housing 30 is pivotally mounted on the frame in a manner described below. Shaft 28 receives its power from the motor through either a belt drive or a friction drive, depending on the position of the control assembly. Mounted on the control shaft 28 for rotation therewith are V-belt pulleys 32, 33 and 34 and friction ring 35. A V-belt 38 is shown in pulleys 22 and 32, although it obviously can be shifted to pulleys 23 and 33 or 24 and 34, depending on what speed is desired. In Figures 1 and 2, V-belt 38 is shown in operative driving engagement but in Figure 3 the V-belt is loose, the drive being accomplished through friction rings 25 and 35.

Figure 5:
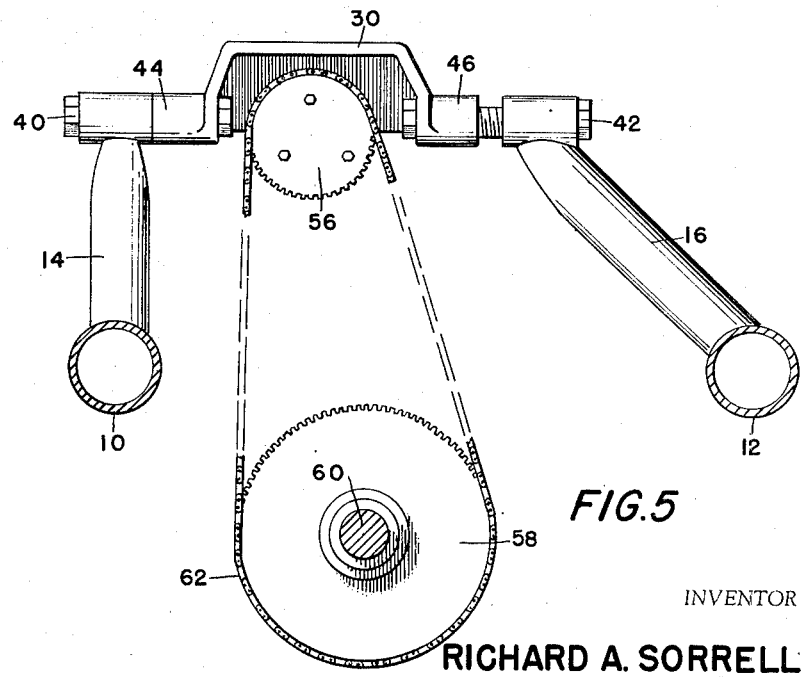
Figure 5 is a view taken along line 5—5 of Figure 1.

Referring now to Figures 1, 4 and 5, it will be seen that frame brackets 14 and 16 are provided with bearing pins 40 and 42 for supporting control shaft housing 30. Pivot sleeves 44 and 46 at the rear of housing 30 are mounted on the pivot pins 40 and 42 to provide a pivot axis for shifting the control shaft into alternate driving engagement with the friction rings 25 and 35 and the belt drive 38. The underside of housing 30 is provided with a depending member 48, which in turn, has an operating recess 50 provided with a forward notch 101, a neutral notch 102 and a reverse notch 103. A manually operable rock lever 52 is pivotally mounted on frame 10 at bearing 54. This control arm is provided with a cam bar 56 which is operatively disposed in recess 50. It will be seen that the control shaft 28 and its housing 30 will be pivotally raised or lowered in relation to the motor power output shaft 20 by manual movement of the control lever 52.

A relatively small sprocket 56 is mounted on the rear end of control shaft 28 as a power take-off. A second sprocket 58 is mounted on the forward end of drive shaft 60 leading to the rear axle (not shown) and a drive chain 62 connects the two sprockets in operative relationship.

The reversing drive construction of this invention is particularly desirable when used in combination with a differential rear end drive of the type commonly used in passenger cars and the like.

By virtue of the dome-shaped construction of the rear end of housing 30, the axis of sprocket 56 passes generally through the pivot axis of control shaft 28 and housing 30. This places the center of the sprocket on the approximate axis of the control shaft pivot and thereby minimizes the effect of sprocket tilting on the alignment of the sprockets 56 and 58. The smallness of the sprocket also contributes to minimizing the tilt.

In operation, the motor is started with the control lever 52 in the neutral position indicated in dotted lines in Figure 2. At this point belt 38 is too slack for driving engagement and friction rings 25 and 35 are slightly spaced so that no driving force is imparted to shaft 28. If the vehicle is to be moved at a fairly rapid speed from one work point to another, the belt is left in the pulleys 22—32. If the tractor is to be used for towing a light work implement, belt 38 may be manually shifted to pulleys 23—33. If the tractor is to be used for pulling a heavy load, the belt may be shifted to pulleys 24—34. Once the selected forward speed has been determined, operating lever 52 is moved forward as in the full line position of Figure 1 and Figure 2. This pivots control shaft 28 and its housing 30 upwardly about pins 40 and 42 to tighten belt 38 in its pulleys. This is the position of forward driving engagement and in this position, shaft 28 is parallel to shaft 20 and shaft 60. Therefore, there is in the forward motion of the vehicle perfect alignment for the belt and pulleys and for the chain and sprockets. If it is desired to reverse the vehicle, the control lever 52 is shifted to the position shown in Figure 3. In this position control shaft 28 and its housing 30 are pivoted downwardly about pivot pins 40 and 42 until the friction ring 35 rests on friction ring 25 in driving engagement and belt 38 is so loosened on its pulleys that forward driving power is ceased. In this position of reverse drive, shaft 28 is slightly tilted but the slight degree of tilt required to reverse the unit is not enough to cause the sprocket 56 to throw the chain 62. The length of shaft 28 also contributes to minimizing the tilt of sprocket 56 because the distance of movement required for reversing is constant, whereas the angle of tilt required to produce that movement is a function of the length of shaft 28.

It will be apparent that a V-belt or other driving means could be used to replace the chain and sprocket drive without loss of the beneficial results of this invention and the terms sprocket and chain are intended to cover such constructions. Likewise, it will be seen that the specific means for raising and lowering control shaft 28 may be widely varied without departing from the scope of this invention. Other modifications will be apparent to those skilled in the art.

I claim:

1. A drive comprising a driving shaft, a driven shaft, pulleys respectively carried by adjacent ends of said shafts, a belt adapted to operatively connect said pulleys, bracket means for mounting the other end of said driven shaft to pivot about an axis transverse to the axis of rotation of said driven shaft and a driving wheel carried by said driven shaft and concentric therewith, and having its driving surface lying in a plane passing through said pivotal axis of said bracket.

2. A reversing drive comprising a driving shaft, a driven shaft, pulleys respectively carried by adjacent ends of said shafts, a belt adapted to operatively connect said pulleys, friction wheels respectively carried by the same ends of said shafts, bracket means for mounting the other end of said driven shaft to pivot about an axis transverse to the axis of rotation of said driven shaft and a driving wheel carried by said driven shaft and concentric therewith, and having its driving surface lying in a plane passing through said pivotal axis of said bracket.

References Cited in the file of this patent

UNITED STATES PATENTS

| Number | Name | Date |
|---|---|---|
| 725,414 | Crawley | Apr. 14, 1903 |
| 783,037 | Herby | Feb. 21, 1905 |
| 968,521 | Baird | Aug. 30, 1910 |
| 1,007,957 | McCausland | Nov. 7, 1911 |
| 1,072,165 | Price | Sept. 2, 1913 |
| 1,091,338 | Houpt | Mar. 24, 1914 |
| 2,046,429 | Ronning | July 7, 1936 |
| 2,457,821 | Johnson | Jan. 4, 1949 |
| 2,535,254 | Atwell | Dec. 26, 1950 |
| 2,602,341 | Lewis | July 8, 1952 |